(12) United States Patent
Pearl

(10) Patent No.: US 7,558,232 B2
(45) Date of Patent: *Jul. 7, 2009

(54) ADAPTIVE DUTY CYCLE MANAGEMENT METHOD AND SYSTEM FOR RADIO TRANSMITTERS

(75) Inventor: Norman Pearl, Montreal (CA)

(73) Assignee: Dataradio, Inc., Montreal, Quebec (CA)

( * ) Notice: Subject to any disclaimer, the term of this patent is extended or adjusted under 35 U.S.C. 154(b) by 577 days.

This patent is subject to a terminal disclaimer.

(21) Appl. No.: 11/223,221

(22) Filed: Sep. 9, 2005

(65) Prior Publication Data

US 2006/0067245 A1   Mar. 30, 2006

Related U.S. Application Data

(63) Continuation-in-part of application No. 09/854,610, filed on May 14, 2001, now Pat. No. 6,950,404.

(51) Int. Cl.
H04B 7/212 (2006.01)
H04B 7/00 (2006.01)
H04J 3/00 (2006.01)

(52) U.S. Cl. .................. 370/321; 370/337; 370/345; 455/522

(58) Field of Classification Search ............ 370/314, 370/318, 321, 326, 336–337, 345, 347, 277–278, 370/282, 442, 498; 455/13.4, 522, 127.1, 455/127.5
See application file for complete search history.

(56) References Cited

U.S. PATENT DOCUMENTS

| | | | |
|---|---|---|---|
| 5,127,036 A | 6/1992 | Pham | |
| 5,134,615 A | 7/1992 | Freeburg et al. | |
| 5,351,043 A | 9/1994 | Hullett et al. | |
| 5,524,275 A | 6/1996 | Lindell | |
| 6,104,759 A | 8/2000 | Carkner et al. | |
| 6,115,390 A | 9/2000 | Chuah | |
| 6,122,492 A | 9/2000 | Sears | |
| 6,127,861 A | 10/2000 | Lee | |
| 6,144,193 A | 11/2000 | Illingworth | |
| 6,477,160 B2* | 11/2002 | Gleeson | 370/337 |
| 6,950,404 B2* | 9/2005 | Pearl | 370/252 |
| 7,245,880 B1* | 7/2007 | Jacobsen | 455/69 |
| 7,330,706 B2* | 2/2008 | Gentsch et al. | 455/127.1 |

(Continued)

OTHER PUBLICATIONS

U.S. Code of Federal Regulations, Title 47, Part 1, Paragraph 1310 (47C.F.R.1.1310) *Radiofrequency Radiation Exposure Limits*; Jul. 10, 2001.

*Primary Examiner*—Tri H Phan
(74) *Attorney, Agent, or Firm*—Koppel, Patrick, Heybl & Dawson

(57) ABSTRACT

A duty cycle management system and method for use in a wireless device having a transmitter which transmits packets in the form of individual packets and/or packet bursts. A controller in combination with an instruction set limits the number of packets transmitted during each time period defined by one time window or adjacent time windows, on a sliding basis, so as to control the duty cycle of transmissions during successive adjacent time windows based on the transmitter's output power, to produce that average power output. The transmission of packets is thereby delayed as needed to establish sufficient idle period(s) during one time window or adjacent time windows to apply whatever duty cycle is needed to produce that average power output level limit for the transmitter.

17 Claims, 4 Drawing Sheets

U.S. PATENT DOCUMENTS

2002/0110085 A1    8/2002   Ho et al.
2004/0137861 A1*   7/2004   Gentsch et al. .......... 455/127.1
2006/0203795 A1*   9/2006   Welborn et al. ............. 370/345

* cited by examiner

ADAPTIVE DUTY CYCLE MANAGEMENT METHOD AND SYSTEM FOR RADIO TRANSMITTERS

RELATED APPLICATION

This application is a continuation-in-part application of application Ser. No. 09/854,610 filed on 14 May, 2001 now U.S. Pat. No. 6,950,404.

FIELD OF INVENTION

The present invention is directed to management of the duty cycle of wireless data transmissions and, in particular, to an adaptive duty cycle management method and system for digital radio frequency (RF) transmitters which control the duty cycle on a sliding window basis to a preselected maximum or varying amount depending on the applicable output power limit(s).

BACKGROUND OF THE INVENTION

There exists a concern regarding the safety to users of wireless communications devices, such as mobile radios and cellular telephones, when these devices are operated in their transmit mode by reason that it is perceived the electromagnetic radiation associated with the transmission of the signals from such devices may pose a potential health hazard to the user. When using a hand-held wireless device the user holds the device near the ear and this positions the devices transmission antenna in close proximity to the user's hand and head as it transmits electromagnetic radiation and it is postulated that a portion of this radiation may be absorbed by the head and hand and that such absorption may cause health risks to the user. The perceived potential health hazard associated with wireless transmitting devices increases as the power of the signals transmitted from the device increases.

To address this perceived health risk many countries have adopted legislation requiring that the effective radiated power (ERP) of wireless devices be limited. For instance, the American National Standards Institute (ANSI) in association with the Institute of Electrical and Electronic Engineers, Inc. (IEEE) has adopted new standards for RF exposure viz. ANSI/IEEE C95.1-1992. The Federal Communications Commission (FCC) has adopted limits for maximum permissible exposure (MPE) time which, generally, are more restrictive than the previously adopted limits and guidelines and apply to land-mobile systems, such as cellular radio, pocket and hand-held radio telephones. These limits are based on recommended exposure guidelines published by the National Council on Radiation Protection and Measurements (NCRP) in "Biological Effects and Exposure Criteria for Radio frequency Electromagnetic Fields," NCRP Report No. 86, Sections 17.4.1, 17.4.1.1, 17.4.2 and 17.4.3. Copyright NCRP, 1986, Bethesda, Md. 20814. The guidelines provide for exclusions to the regulations if it can be shown through laboratory procedures that exposure conditions do not exceed a certain specific absorption rate (SAR) or, alternatively, if the radiated power is below a certain level.

A quantification of MPE for uncontrolled environments is based on, inter alia, the electric and magnetic field strengths, the power density, the frequency range of the radio signal, the distance between the user's head and the transmitter radiating point. Thus, the MPE can be correlated to a maximum permitted transmission power, which may vary with the frequency range of a wireless device.

One method of meeting the applicable MPE limitations is to reduce the duty cycle of the transmitter. While techniques such as TDM (time division multiplexing) inherently activate the transmitter for less than 100% percentage of the total communication time, it is not an easy task to reduce the duty cycle of the transmitter on a source basis (i.e. without regard to network traffic) in such a way as to effectively control the duty cycle without negatively degrading the performance of the network and without averaging duty cycles over unreasonably long periods (tens of minutes or hours). Instead, since data is randomly transmitted over various time intervals, it is desired that the wireless device itself limit the effective transmit (active) time.

Some wireless devices are further capable of transmitting at several power levels, under command of a base station or independently, such as reducing output power to conserve battery power when close to a base station, or increasing output power to overcome interference.

In order to address the foregoing need for an effective method and system for managing the duty cycle of a transmitter the inventor developed the subject matter herein which makes effective use the quiet time inherent during a transmission.

SUMMARY OF THE INVENTION

The present invention provides a method and system for adaptively limiting the duty cycle of a transmitter of a wireless device in order to comply with MPE requirements while preserving the ability to broadcast RF signals at a level sufficient to establish and/or maintain a quality radio link. This is achieved by sliding (moving) a reference window of time over which a preselected duty cycle is calculated (e.g. one minute), thereby taking advantage of any quiet time preceding a burst, and afterwards enforcing only as much quiet time as required to meet the desired duty cycle limitation. The specific duty cycle to be imposed by the method and system can be fixed for an application where the output power level is constant (i.e. a duty cycle of, say, 2% can be set as can a duty cycle of, say, 25%) or, alternatively, it can be varied where the transmitter output power is varying. This reflects the fact that a duty cycle of, say, 25% at 50 W would result in the same average power output for a duty cycle of 50% at 25 W. The resulting average power output is therefore also controllable by selecting the appropriate duty cycle. When the transmitter power output is variable, it is the average power output which becomes the limiting value, and the allowed duty cycle becomes variable and a function of the actual (i.e. instantaneous) power output (which is also variable) and the transmission history, so as to remain within the allowable average power output.

In accordance with the present invention there is provided a duty cycle management system and method for use in a wireless device comprising a transmitter for transmitting packets in the form of individual packets and/or packet bursts comprising a predetermined maximum number of contiguous packets. The transmitter is operable over a duration measurable as a series of contiguous time windows with each time window comprising a predetermined number of timeslots and each timeslot having a predetermined nominal duration. The transmitter is configured for transmitting one packet during one timeslot and has an associated average power output for the transmitted packets. A controller in combination with a storage medium containing instructions executable by the controller limits the number of packets transmitted during each time period defined by one time window or adjacent time windows, on a sliding basis, so as to control the duty cycle of transmissions during successive adjacent time window(s) based on the transmitter power output to produce that associated (applied) average power output. In doing so the transmission of packets is delayed as needed to establish sufficient idle period(s) during adjacent time windows to apply whatever duty cycle is needed to produce that average power output.

The controller identifies prior to the transmission of a packet whether such packet is an individual packet or a burst packet. A counter is used in the preferred embodiment for keeping a running count which may be correlated to the duty cycle over one or more time windows. The counter is incremented by an amount of either IC or two times IC for each timeslot in which a packet is transmitted and is decremented by an amount DC for each idle timeslot, whereby the ratio of IC to DC is the duty cycle to be applied. For a transmitter capable of operating at various output power levels a corresponding value of amount IC is provided (and stored) for every output power level. For an individual packet, transmission of the packet is permitted when the counter amount does not exceed a maximum counter amount equal to the predetermined number of timeslots per time window. However, transmission of the packet is delayed when the counter amount has reached that maximum counter amount (viz. the predetermined number of timeslots per time window) until the counter amount falls below the maximum counter amount. For a burst packet, the controller tests, by determining whether the counter amount plus the number of packets in the burst times IC is equal to or greater than the maximum counter amount, whether transmission of the number of packets in the burst would cause the counter amount to reach the maximum counter amount. If it would only an individual packet is transmitted (not the burst) and if it wouldn't the burst is transmitted. In a special case where the duty cycle is so low that transmission of a single packet burst within one time window would increase the counter amount by an amount near or equal to the maximum counter amount, the controller permits transmission of the burst packets only if the counter amount is zero and, if the counter amount has been zero for at least a number of timeslots equal to the predetermined number of timeslots per time window, the counter is incremented by IC or, if the counter amount has not been zero for at least a number of timeslots equal to the predetermined number of timeslots per time window, the counter is incremented by two times IC.

Preferably, the controller in combination with the instructions is configured for providing priority, for transmission, to a predetermined maximum number of acknowledgement packets by permitting transmission of up to maximum number of acknowledgement packets when the counter amount is equal to or greater than IC/DC times the maximum number of packets per packet burst but less than a predetermined maximum count.

Advantageously, the invention provides for a wireless transmission not exceeding an established duty cycle limit based on short fixed-length windows of time, while permitting longer transmission times in the form of bursts in order to improve response times. This results in a greater range of power output, which maximizes transmitter's ability to maintain quality radio links while avoiding possible detrimental effects associated with uncontrolled radiation environments.

BRIEF DESCRIPTION OF THE DRAWINGS

A preferred embodiment of the invention is described below, by way of example only and without intending to limit the scope of the invention claimed herein, with reference to the following drawings.

DETAILED DESCRIPTION OF AN EMBODIMENT OF THE INVENTION

The following description is of an example of a preferred embodiment of the invention which is provided only for purposes of illustration and without any intention to limit the invention to this particular example or to any particular duty cycle limit.

In digital wireless transmission, the transmitter circuitry modulates a carrier signal with a digital signal comprised of data packets. The transmission of the modulated data packets is typically performed according one of two modes being that of individual packets or bursts of packets. Each packet comprises address, data, sender identification and control portions and instead of being transmitted continuously they are stored until an individual packet, or a group of packets is ready for transmission. Therefore, the output power generated by the transmitter follows a pattern of short intervals in order to transmit bursts (being groups of packets) coupled with relatively long periods of quiet time (also referred to as idle time) between such short burst intervals. In the example of the preferred embodiment a packet burst is defined to be from 3 to 23 packets.

Figure 1:
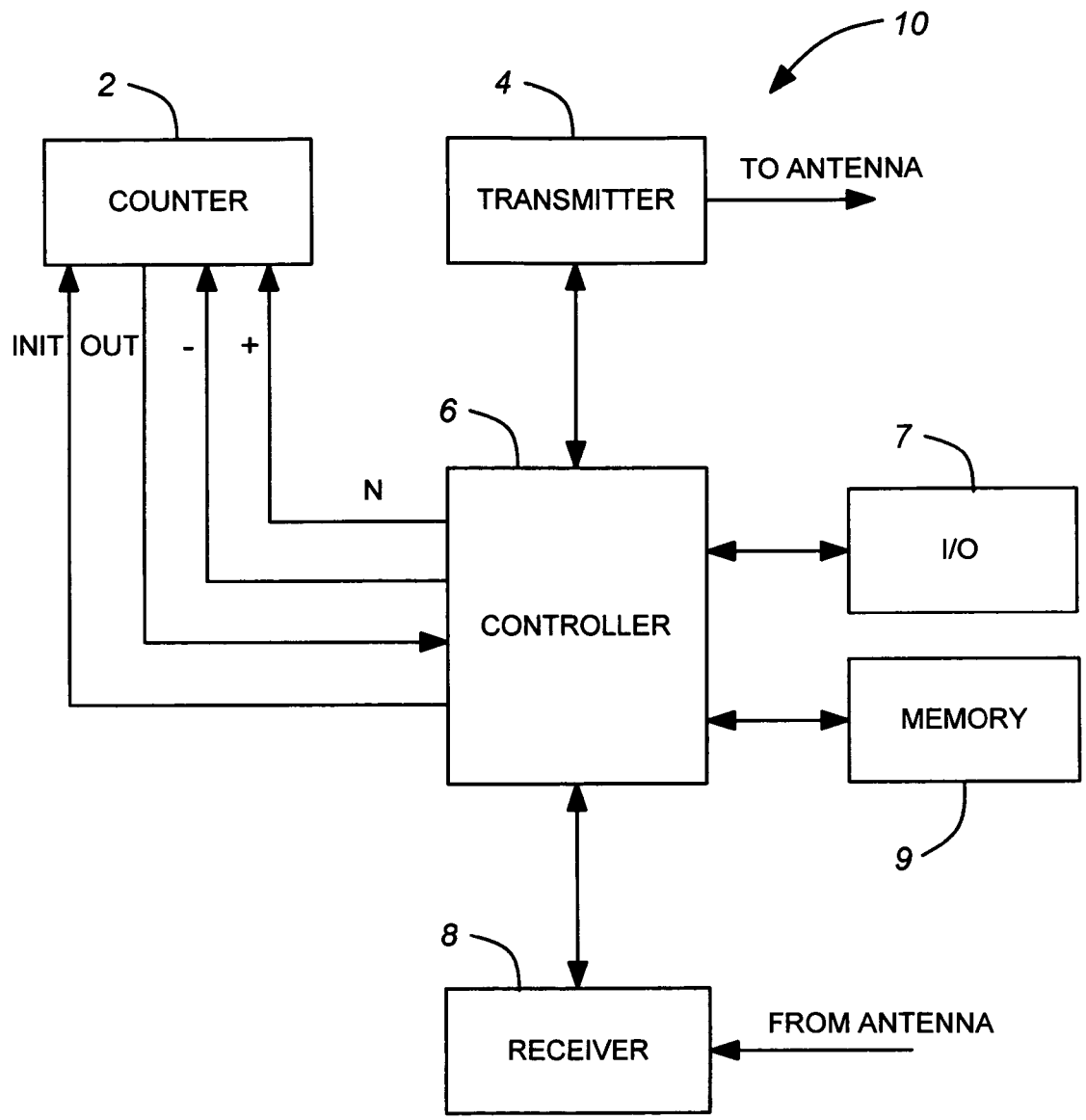
FIG. 1 is a block diagram of the adaptive duty cycle management system components of a digital wireless device (such as a private network mobile radio unit or public network wireless phone) in accordance with the invention.

Referring to FIG. 1, there is shown a block diagram of adaptive duty cycle management system components of a digital wireless device (such as a private network mobile radio unit or public network wireless phone) in accordance with the present invention. It is to be understood that only those components of the device which relate to this invention are shown and that many other components of the wireless device are not shown.

The wireless device 10 includes a transmitter 4, a controller 6 which is a suitable microprocessor in the preferred embodiment, a receiver 8, and a counter 2 which is provided by a memory component and the microprocessor in the preferred embodiment. Device 10 may be a mobile unit, or any transceiver used in the industry. The transmitter 4 and receiver 8 establish connection with the wireless network (e.g. cellular network) in the manner well-known to persons skilled in the art, under control of the controller 6. Machine readable storage 9, comprising non-volatile memory, stores the duty cycle management system algorithm and information and parameters utilized thereby including a first amount "IC" and a second amount "DC" representing the value of an increment count and the value of a decrement count, respectively, whereby the parameters IC and DC are assigned as described herein for use by the system in applying the duty cycle management method.

Where the transmitter is capable of operating at several discrete power output levels, a separate value of IC is stored for each such power output level. Values of IC corresponding to power output levels below the maximum are a corresponding fraction of the maximum-power value IC.

Where the transmitter is capable of continuously varying the power output over a range, values of IC are stored for the maximum and minimum power output levels. The controller 6 calculates a value of IC for each transmission by interpolating between the maximum and minimum values of IC in proportion to the actual (instantaneous) power output level.

For each such type of transmitter i.e. transmitting a discrete or varying power output level, the algorithm applying the decrement-count (DC) and maximum count parameters is the same as that used for a transmitter which transmits a single (constant) power output level, as described hereinafter.

In this embodiment a counter 2 is provided for use in controlling the active time of a transmitter. The counter 2 functions in co-operation with other components of the system shown in FIG. 1 to limit the transmitter duty cycle to a selected duty cycle (DS) which, for one exemplary embodiment presented in the following, is selected to be 2% in order to achieve 1.5 W ERP using a 40 W transmitter with a 3 dB (approximately) gain antenna. In this embodiment the counter maintains a running count which may be correlated to the duty cycle over one or more time windows and it does so by incrementing an amount of either IC or two times IC for each timeslot in which a packet is transmitted and decrementing by an amount DC for each idle timeslot, the ratio of IC to DC being the duty cycle limit. Thus, the duty cycle limit and the resulting average power output can be varied simply by changing the value of IC and/or DC so as to change the ratio IC/DC (which equals the duty cycle limit).

For the example of a 2% duty cycle, when the transmitter transmits in the individual packet mode the packets are sent in timeslots (alternatively referred to as "slots" herein) of 52 ms nominal duration (which corresponds to about 1153 slots/minute), at a maximum rate of 23 packets per minute, and the time window (T) in this example is considered to be 1 minute (i.e. 2%=X packets/60 sec.×0.052 sec/timeslot, so X=23). When operating in burst mode the transmitter transmits a contiguous series of 3 to 23 packets (maximum) over a time period totalling about 1.2 seconds maximum (i.e. 23×0.052 seconds) at a transmission rate of 19,200 bits/sec. Bursts are considered to represent a special case in this example, due to the relatively low duty cycle limit of 2%, and can be transmitted no more than once per minute (this one minute window corresponding to about 1153 slots). A further example, applying a relatively high duty cycle limit of 25%, for timeslots of the same 52 ms nominal duration, allows for a maximum of 288 packets per minute (i.e. 25%=X packets/60 sec×0.052 sec/timeslot, so X=288) so many bursts of up to 23 packets may be transmitted within one time window of 1 minute without nearing the maximum duty cycle of 25%.

As is well-known in the art, the determination of when to transmit a burst is made when the wireless device makes a reservation request to the base station to request permission to send a burst and the base station grants such reservation request.

FIGS. 2(*a*) and 2(*b*) are flowcharts showing the steps performed by the duty cycle management system which utilizes the controller 6, the counter 2 and memory 9. These flowcharts each represent a repetitive algorithm which is repeated for each time slot 13 and this algorithm is implemented in one or more computer programs which are executable by the controller 6 (microprocessor). FIG. 2(*a*) shows the normal steps of the algorithm to be used for individual packet and burst packet transmission when a relatively high duty cycle limit is applied (e.g. 25%) and FIG. 2(*b*) shows the special case steps of the algorithm to be used for individual packet and burst packet transmission when a relatively small duty cycle limit is applied (e.g. 2%). For a selected duty cycle of 25% in this illustrated example a firmware counter 2 increments by the increment count (IC) 15,16 amount of 4 upon each individual packet transmission 11 and decrements by the decrement count (DC) 17 amount of 1 upon each idle (receive) slot 12 (i.e. 1/4 equals 25%) whereas for a duty cycle of 2% the counter 2 is incremented by 50 (i.e. IC=50) upon each individual packet transmission and decremented by 1 (i.e. DC=1) upon each idle (receive) slot (i.e. 1/50 equals 2%).

For a transmitter providing an option for multiple discrete or varying power output levels the amount of IC is adjusted, as needed, to respect both the required duty cycle and the average power output limit. If, for example, such transmitter operates at reduced power level of 50% of its maximum rating, the foregoing increment count (IC) 15,16 amount is reduced from 4 to 2. This doubles the 25% duty cycle to 50% while maintaining the same average power output. Similarly, at a 25% power output level, the foregoing increment count (IC) 15,16 amount is reduced to 1 and the resulting duty cycle is further increased. The average duty cycle becomes variable when a mix of different power levels are used, but the overall average power output limit is respected. As will be readily understood by the reader, finer granularity of power levels and resulting duty cycles are achieved by suitable selection of values for IC, DC and the maximum count amount (Max).

When the counter 2 exceeds a maximum counter amount equal to the predetermined number of timeslots per time window, being 1153 for these examples, the system halts any further transmissions because this means that, at this point in time, a ratio of 4 to 1 packets (representing a duty cycle of 25%) or 50 to 1 packets (representing a duty cycle of 2%) have been transmitted over the preceding window time period T.

For the example of a 25% duty cycle limit a single packet burst of the maximum 23 packets will only increment the counter 2 by 92 counts (i.e. 4×23), which is far below the maximum count amount of 1153, so several bursts may be transmitted within one time window without pushing the counter amount close to the maximum count threshold 19. However, for the low duty cycle limit example of 2% a single packet burst can, if it consists of 23 packets, use up essentially all of the permissible time slots for a given time window. Consequently, for this special case example (see FIG. 2(*b*)) a packet burst may only be sent when the value of the counter 2 is zero. From a time line perspective this means that a 1.2 sec maximum-length burst transmission (i.e. 52 ms×23=1.2 sec) leaves the counter 2 at its maximum value of 1150 for that increment level (IC) and this inhibits any further burst transmissions for the next period of 59.8 seconds calculated on the basis of 1150×52 ms. This represents the worst-case duty cycle limit of 2% and results in a calculated duty cycle value of 1.96% over the period of those 1150 timeslots which satisfies this duty cycle limitation of 2% (i.e. 1.2 sec divided by (59.8 sec+1.2 sec=1.2/61=1.96%).

Figure 2A:
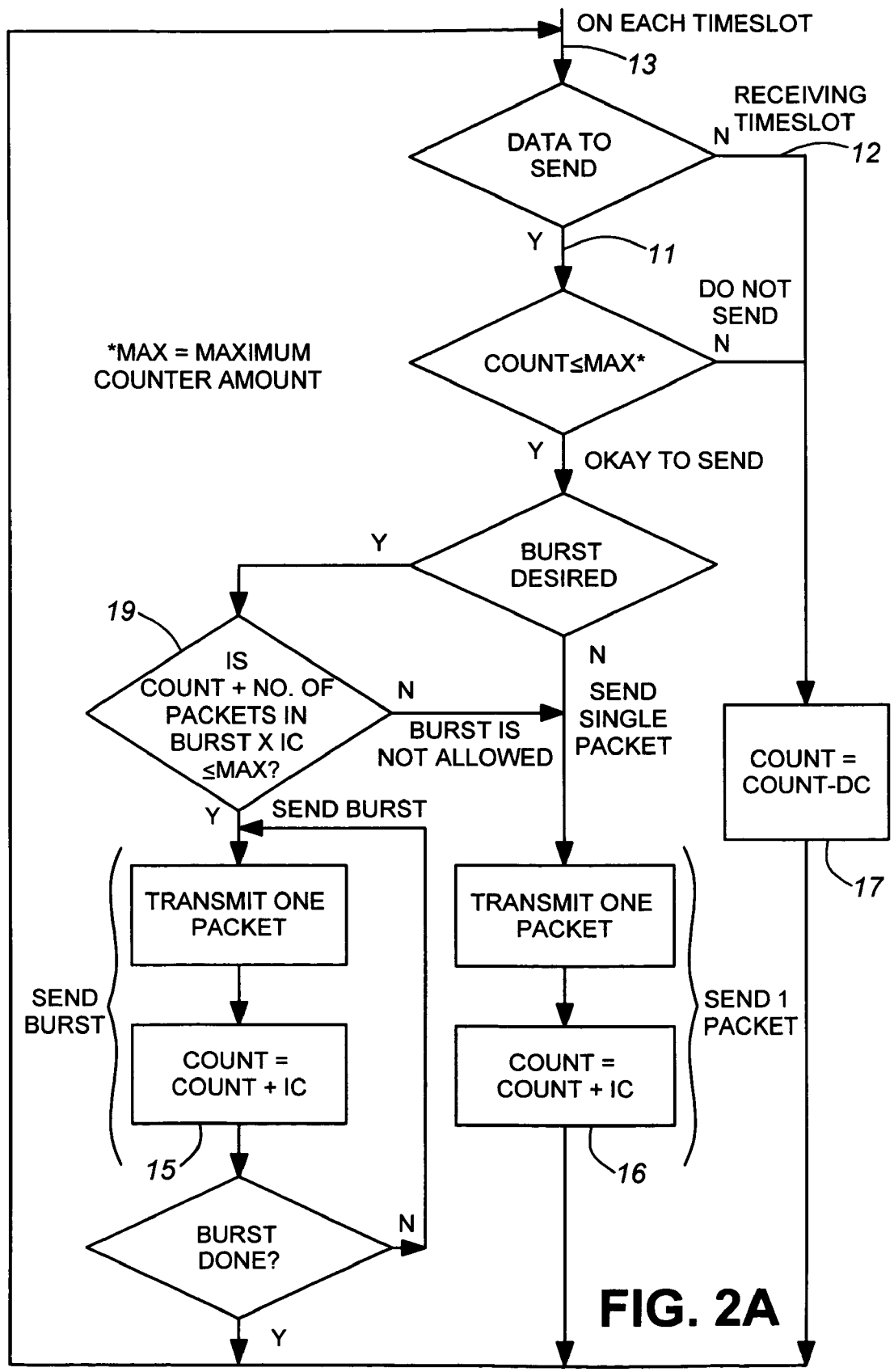
FIG. 2(a) is a flow chart of the steps performed by the adaptive duty cycle management system shown in FIG. 1 whereby a relatively high duty cycle, e.g. 25%, is applied
Figure 2B:
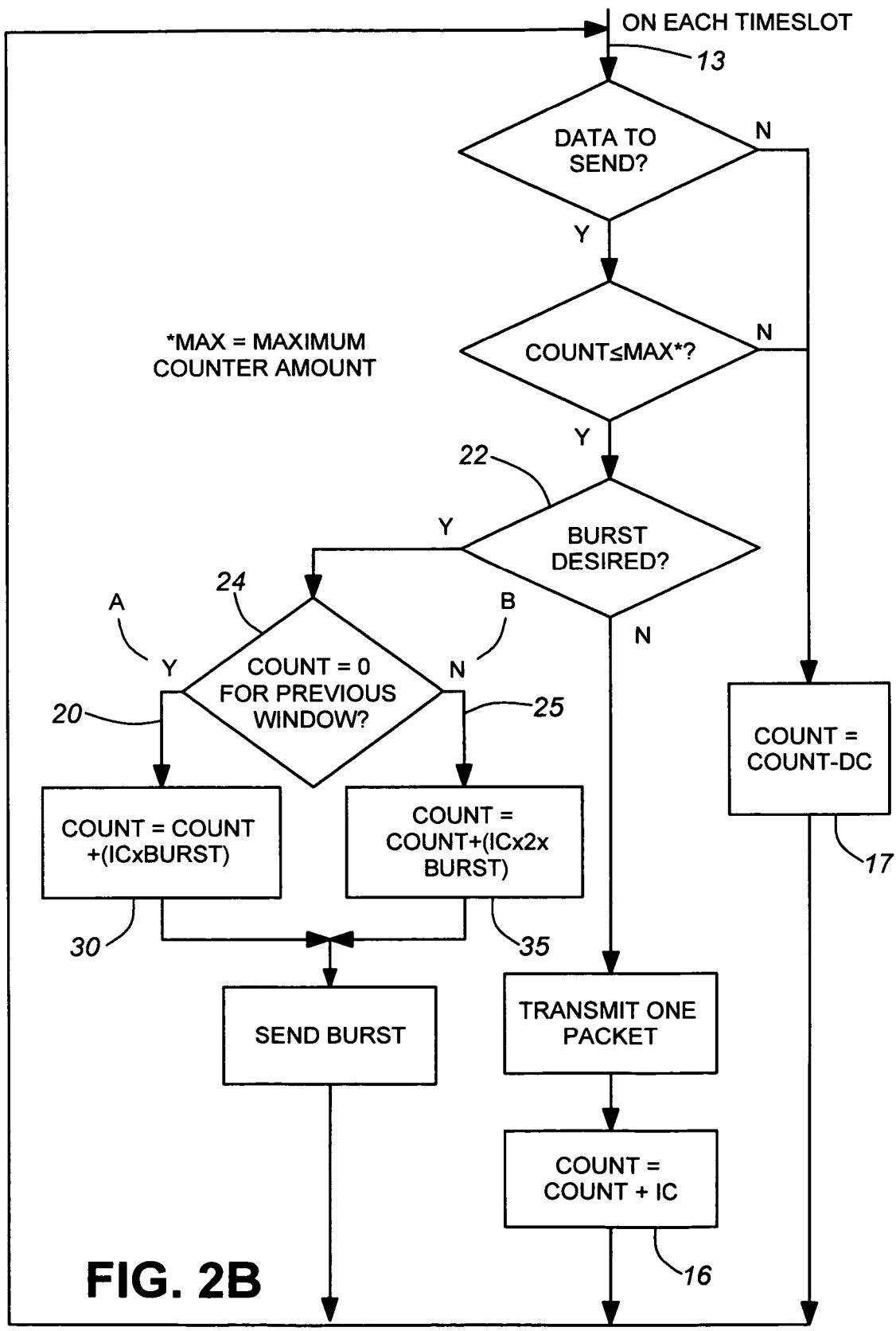
FIG. 2(b) is a flow chart showing the special case steps performed by the adaptive duty cycle management system whereby a relatively low duty cycle, e.g. 2%, is applied such that transmission of a single packet burst within a number of timeslots equal to the predetermined number of timeslots per time window would increase the counter amount by an amount near or equal to the maximum counter amount.
Figure 3A:
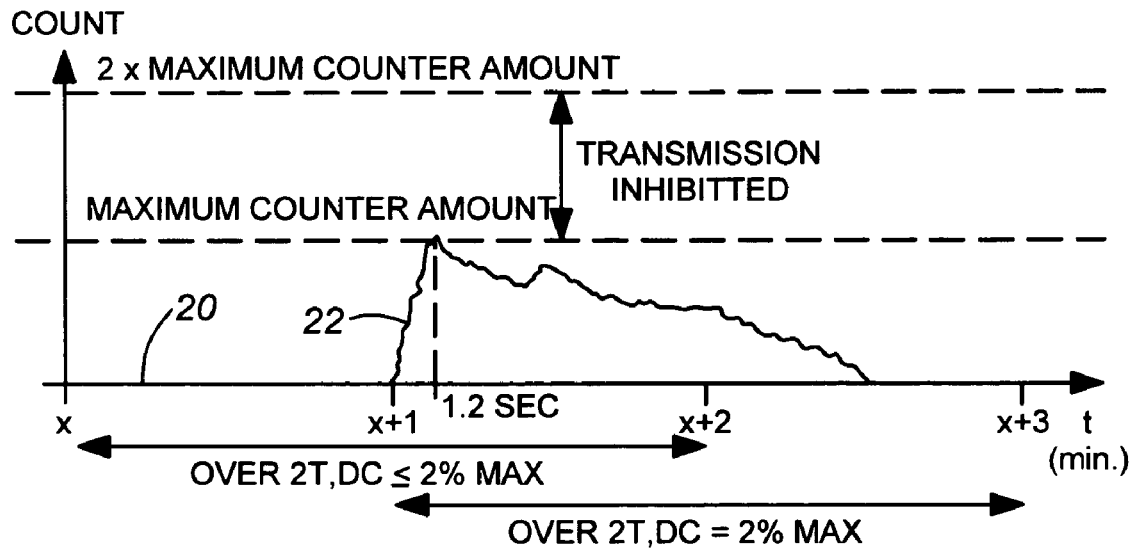
FIGS. 3(a) and 3(b) are graphs showing the count pattern established by the controller for the special case example of FIG. 2(b) by which a low duty cycle of 2% is applied, with three full one-minute time windows being shown, wherein the graph of FIG. 3(a) shows the situation in which a burst occurs during the second time window following an idle period during the first time window and the graph of FIG. 3(b) shows the special case situation in which a burst occurs during the second time window following the transmission of some packets during the first time window.
Figure 3B:
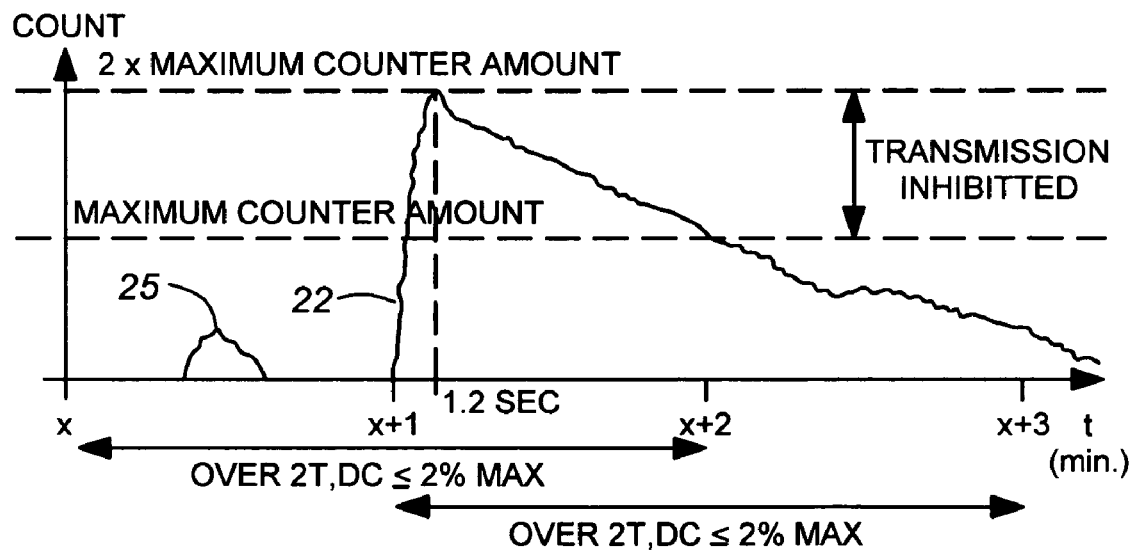

As shown by FIG. 2(a), the special case algorithm of the duty cycle management system (i.e. the situation in which a single packet burst would render the counter close to the maximum counter amount within a single time window) is performed on an adaptive basis whereby one of two methods (algorithms), A or B, is selected and performed for the transmission of bursts 22 and the selection of which algorithm is performed impacts upon the performance of the system in relation to the communications network. FIGS. 3(a) and 3(b) illustrate, graphically, the results of performing methods A and B, respectively, for a duty cycle (DC) limit of 2%. The steps of method A are performed when there have been no transmissions at all 20 (see FIG. 3(a)) (i.e. no burst and no individual packet) for a number of timeslots equal to the predetermined number of timeslots per time window prior to the pending burst (i.e. the counter value 24 is zero and there must have been no increment to the counter during the immediately preceding time window). As shown by FIG. 2(b), the counter is incremented 30 by IC for each packet in the burst. This limits the duty cycle of bursts plus individual packets to 2% over any double window period 2T (i.e. any period of 2 minutes in this example). Application of this method will occur in networks where a burst is typically the first of a series of transmissions, and may be followed by a small number of individual packets such as an application-level acknowledgement packet (alternatively referred to herein as an 'ACK' packet, being a type of packet used to acknowledge receipt of an incoming message). For purposes of network efficiency it is desirable to avoid delays in transmitting "ACK" packets as this may cause an unnecessary retransmission of the message and, thus, an "ACK" priority feature, as detailed more fully below, may be used in combination with duty cycle algorithm of the invention in order to enhance the overall network performance.

The steps of method B are performed when the value of the counter 24 is zero but the counter has been incremented 25 (see FIG. 3(b)) during the immediately preceding window i.e where some individual packets have been sent during that window. For this method the counter is incremented 35 by 2 times the value of IC (i.e. by 100 in the foregoing example applying a 2% duty cycle limit) for each packet in a burst. Following the transmission of the burst in this example the value of the counter is 2300 (calculated on the basis of 100 times 23 packets) and this means that following a maximum-length burst all transmissions will be halted for one time window (i.e. 1 minute in this example) and any further burst will be halted for two time windows (i.e. 2 minutes in this example). Application of this method will occur in networks where a burst typically ends a series of exchanges.

These two alternate burst-mode methods (A and B) are selected adaptively to yield best performance by using the following algorithm (this is also illustrated by FIG. 2(a)):

IF
   there have no transmissions during the preceding window
THEN
   A: debit burst packets at 1×IC each (IC=50 in the example) (It is necessary to exclude the reservation-request packet, or make the debit-rate decision at reservation-request time and not at burst transmit time or the above case will never be true.)

ELSE
   B: debit burst packets at 2×IC each (IC=50 in the example)

By performing the steps of this algorithm the system automatically allows individual packets to follow a burst at 1 packet per 2.6 seconds if the transmitter was idle for the minute before the burst and if the transmitter was not idle for the minute before the burst it defers all post-burst transmissions for 1 minute and prevents additional bursts for 2 minutes.

When the counter 2 is non-zero but still below the maximum counter amount only individual packet transmissions are allowed. Each packet transmission increments the counter by 50, limiting the sum of individual packets to the same 2% duty cycle as burst transmissions.

The pre-burst zero-count limitation prevents a burst from following individual packets and exceeding the 2% duty cycle. Following a burst transmission, individual packets can be sent only if the original burst was shorter than the full 23-packet maximum, or if sufficient time has elapsed to decrement the counter sufficiently to enable an amount IC to be added without going over the maximum counter amount. These limitations maintain the duty cycle, defined by the ratio of (burst+packet) to (burst+idle+packet), to 2% or less. In other terms, these limitations impose a maximum transmission rate of one individual packet per 2.6 seconds (52 ms/2600 ms=2%) or groups (not bursts) of 2-3 individual packets at shorter intervals only if surrounded by longer periods of idle.

At data rates below 19,200 bits/sec, the slot duration may differ from the averaged value of 52 msec used for this example but, because the duty-cycle management method counts slots at the rate of IC for each transmitted packet (i.e 50×tx) minus DC for each idle slot (i.e. 1×rx), it automatically scales for other slot durations while still enforcing the selected duty cycle (being 2% in this example). For example, if the averaged slot duration were to be 112 ms the maximum burst duration would be 2.576 seconds (i.e. 23 packets×112 ms) and this would be followed by 128.8 seconds of idle (i.e. if 1150 idle slots are used for a calculation of the remainder of the time window whereby 1150×112 ms=128.8). Therefore, the resulting average duty cycle over the calculated timeslots would be the same as that shown above for the situation in which the averaged slot duration was 52 ms: 2.576 s/(2.576 s+128.8 s)=1.96%.

Optionally, a provision for acknowledgement (ACK) priority may be implemented in combination with the duty cycle management method of the invention, it being recognized that ACK packets are always short individual transmissions and never bursts. This option may be used to address a need to avoid the situation in which the wireless communication device, having reached its duty-cycle limit, will be unable to acknowledge receipt of an incoming message, one overall network performance objective being to allow for the transmission of acknowledgments in a timely fashion so as to prevent unnecessary re-transmissions from the base station and maintain network throughput. Accordingly, in one preferred embodiment of the invention an ACK priority exception is implemented in combination with the foregoing duty cycle management algorithm. This exception algorithm is configured to permit the transmission of an ACK packet (if required) following the transmission of a packet. This anticipates that an inbound (from mobile to base) transmission may contain a query which will generate an outbound (from host to mobile) response. Unlike the duty-cycle management method, this permitted priority-ACK limit is not cumulative but is instead a fixed (configurable) maximum number of ACKs which can follow a data transmission.

The acknowledgment transmissions are counted (debited) as normal transmissions by the duty-cycle calculation and will further delay other data transmissions as required to respect the duty cycle limit.

To respect the duty-cycle limit, only a small number (typically one) of ACKs can follow a data transmission. This provides a two-stage limit (or a 'soft threshold') for the duty-cycle; a first level after which a unit will not transmit further data but may send an ACK, and a second limit (i.e. a predetermined priority maximum count), shortly beyond, after which the unit will not make any further transmissions. Alternatively, the system could apply a lower maximum threshold (e.g. slightly less than 1150) for the transmission of data packets and a higher one (i.e. greater than 1150) for ACKs.

For the foregoing example, providing for a 2% duty cycle limit, the ACK priority feature utilizes the fact that the maximum counter amount of 1150 is less, by about 3 timeslots (actually 3.8 timeslots in that there are actually 60 sec/52 msec=1153.8 slots in one minute), than the actual number of timeslots in one time window of one minute. The 'priority' mechanism operates so as to assure that the full maximum number of timeslots is not consumed by data such that there remains some 'headroom' for the priority-acknowledgement packets. In other words, data is throttled at 1150 timeslots, but an acknowledgement packet would be permitted to be transmitted up to a maximum point of the 1152 or 1153 timeslot so as to allow an ACK packet to be sent even if data cannot be sent pursuant to the governing duty cycle management algorithm.

The individual circuit and processing functions utilised in the foregoing described preferred embodiment are, individually, well understood by those skilled in the art, and it is to be understood by the reader that a variety of other implementations may be devised by skilled persons for substitution. Further, it should be noted that although some of the system components described herein are stated to be implemented by firmware in the preferred embodiment a person skilled in the art will recognize that it may be preferred for another application to implement such components in hardware. Persons skilled in the field of communication design will be readily able to apply the present invention to an appropriate implementation method for a given application.

Consequently, it is to be understood that the particular embodiment shown and described herein by way of illustration is not intended to limit the scope of the invention claimed by the inventor which is defined by the appended claims.

What is claimed is:

1. A duty cycle management method for limiting the transmission duty cycle of a transmitter of a wireless device whereby said transmitter transmits packets in the form of individual packets and/or packet bursts, said packet bursts comprising a predetermined maximum number of contiguous packets, said transmitter being operable over a duration measurable as a series of time windows whereby each said time window comprises a predetermined number of timeslots with each timeslot having a predetermined nominal duration, said transmitter being configured for transmitting a packet during one said timeslot and having an associated average power output for said transmitted packets, said method comprising limiting the number of packets transmitted during each time period defined by one time window or adjacent time windows, on a sliding basis, by controlling the duty cycle of transmissions during successive adjacent time windows, based on said transmitter's output power, to produce said average power output, whereby the transmission of packets is delayed as needed to establish sufficient idle period(s) during said one time window or adjacent time windows to apply a duty cycle calculated based on said average power output divided by said transmitter's output power.

2. A method according to claim 1 comprising incrementing a counter by a first amount (IC) for each timeslot in which a packet is transmitted by said transmitter and decrementing said counter by a second amount (DC) for each idle timeslot and delaying transmission of any further packet if said counter amount exceeds a maximum counter amount equal to said predetermined number of timeslots per time window, whereby the ratio of said first amount (IC) to said second amount (DC) is said duty cycle.

3. A method according to claim 2 whereby said duty cycle is a predetermined value where said transmitter operates at a single power output level, said duty cycle comprises multiple predetermined values where said transmitter operates at multiple discrete power output levels and said duty cycle comprises varying values between maximum and minimum values where said transmitter operates at varying power output levels.

4. A method according to claim 2 whereby the value of one or both of said first amount (IC) and said second amount (DC) is selected in order to realize said duty cycle.

5. A method according to claim 4 including identifying prior to the transmission of a packet the applicable mode of transmission, being either individual packet or packet burst mode and, if said packet burst transmission mode is identified, determining whether the counter amount plus the number of packets in the identified packet burst times said first amount (IC) is equal to or greater than the maximum counter amount and, if it is transmitting an individual packet only and if it isn't transmitting said packet burst.

6. A method according to claim 5 and including, where the duty cycle is such that transmission of a single packet burst within one time window would render said counter amount close or equal to said maximum counter amount, transmitting said burst packets only if said counter amount is zero and, if said counter amount has been zero for at least a number of timeslots equal to said predetermined number of timeslots per time window, incrementing said counter by said first amount (IC) or, if said counter amount has not been zero for at least a number of timeslots equal to said predetermined number of timeslots per time window, incrementing said counter by two times said first amount (IC).

7. A method according to claim 5 including providing priority, for transmission, to a predetermined maximum number of acknowledgement packet(s) by permitting transmission of up to maximum number of acknowledgement packet(s) when said counter amount is equal to or greater than said maximum count number but less than a predetermined priority maximum count.

8. A computer-readable medium containing computer instructions executable by a controller in communication with a transmitter of a wireless device, wherein said transmitter is operable over a duration measurable as a series of time windows with each said time window comprising a predetermined number of timeslots, said instructions performing the steps of incrementing a counter by a first amount (IC) for each timeslot in which a packet is transmitted by said transmitter and decrementing said counter by a second amount (DC) for each idle timeslot and delaying transmission of any further packet when said counter amount exceeds a maximum counter amount of said predetermined number of timeslots per time window, whereby the ratio of IC to DC represents a duty cycle of said transmitted packets.

9. A computer-readable medium according to claim 8 wherein said duty cycle is a predetermined value where said transmitter operates at a single power output level, said duty cycle comprises multiple predetermined values where said transmitter operates at multiple discrete power output levels and said duty cycle comprises varying values between maximum and minimum values where said transmitter operates at varying power output levels.

10. A computer-readable medium according to claim 9 wherein said instructions perform the steps of identifying prior to the transmission of a packet the applicable mode of transmission, being either individual packet or packet burst mode, and if said packet burst transmission mode is identified, determining whether the counter amount plus the number of packets in the identified packet burst times said first amount (IC) is equal to or greater than said maximum counter amount and if it is transmitting an individual packet only and if it isn't transmitting said packet burst.

11. A computer-readable medium according to claim 10 wherein said instructions include, where the duty cycle is such that transmission of a single packet burst within one time window would render said counter amount close or equal to said maximum counter amount, performing the following steps:
   (a) transmitting said burst packets only if said counter amount is zero; and,
   (b) if said counter amount has been zero for at least a number of timeslots equal to said predetermined number of timeslots per time window, incrementing said counter by said first amount (IC) or, if said counter amount has not been zero for at least a number of timeslots equal to said predetermined number of timeslots per time window, incrementing said counter by two times said first amount (IC).

12. A duty cycle management system for use in a wireless device, said wireless device comprising a transmitter for transmitting packets in the form of individual packets and/or packet bursts, said packet bursts comprising a predetermined maximum number of contiguous packets, said transmitter being operable over a duration measurable as a series of time windows with each said time window comprising a predetermined number of timeslots, each said timeslot having a predetermined nominal duration, said transmitter being configured for transmitting a packet during one said timeslot and having an associated average power output for said transmitted packets, said duty cycle management system comprising a controller and a storage medium containing instructions executable by said controller for limiting the number of packets transmitted during each time period defined by one time window or adjacent time windows, on a sliding basis, so as to control the duty cycle of transmissions during successive adjacent time windows based on said transmitter's output power, to produce said average power output, whereby the transmission of packets is delayed as needed to establish sufficient idle period(s) during said one time window or adjacent time windows to apply a duty cycle calculated based on said average power output divided by said transmitter's output power.

13. A system according to claim 12 comprising a counter wherein said counter is incremented by said first amount (IC) for each timeslot in which a packet is transmitted by said transmitter and said counter is decremented by said second amount (DC) for each idle timeslot, and transmission of any further packet is delayed when said counter amount exceeds a maximum counter amount equal to said predetermined number of timeslots per time window, wherein the ratio of said first amount (IC) to said second amount (DC) is said duty cycle.

14. A system according to claim 13 wherein said duty cycle is a predetermined value where said transmitter operates at a single power output level, said duty cycle comprises multiple predetermined values where said transmitter operates at multiple discrete power output levels and said duty cycle comprises varying values between maximum and minimum values where said transmitter operates at varying power output levels.

15. A system according to claim 14 wherein the applicable mode of transmission, being either individual packet or packet burst mode, is identified prior to the transmission of a packet and, where said packet burst transmission mode is identified, if the counter amount plus the number of packets in the identified packet burst times said first amount (IC) is equal to or greater than the maximum counter amount, only an individual packet is transmitted and otherwise said packet burst is transmitted.

16. A system according to claim 15 wherein the duty cycle is such that transmission of a single packet burst within one time window would render the counter amount close or equal to said maximum counter amount and said burst packets are transmitted only if said counter amount is zero, said counter being incremented by said first amount (IC) if said counter amount has been zero for at least a number of timeslots equal to said predetermined number of timeslots per time window and said counter is incremented by two times said first amount (IC) if said counter amount has not been zero for at least a number of timeslots equal to said predetermined number of timeslots per time window.

17. A system according to claim 15 wherein said controller in combination with said instructions is configured for providing priority, for transmission, to a predetermined maximum number of acknowledgement packet(s) by permitting transmission of up to maximum number of acknowledgement packet(s) when said counter amount is equal to or greater than said first amount divided by said second amount (IC/DC) times said maximum number of packets per packet burst but less than a predetermined maximum count.

* * * * *